(12) United States Patent
Harrison

(10) Patent No.: US 8,546,694 B1
(45) Date of Patent: Oct. 1, 2013

(54) CORD MANAGEMENT DEVICE

(76) Inventor: Chris Harrison, Kernersville, NC (US)

( * ) Notice: Subject to any disclaimer, the term of this patent is extended or adjusted under 35 U.S.C. 154(b) by 15 days.

(21) Appl. No.: 13/405,277

(22) Filed: Feb. 25, 2012

(51) Int. Cl.
H01B 7/00 (2006.01)

(52) U.S. Cl.
USPC ......... 174/135; 174/68.1; 174/68.3; 385/134; 385/135

(58) Field of Classification Search
USPC .............. 174/480, 17 R, 50, 72 A, 68.1, 68.3, 174/135, 72 R, 95, 100, 92, 559, 650, 70 R; 439/501, 535; 220/3.2, 3.3, 4.02; 242/405.1, 242/388; 385/134, 135
See application file for complete search history.

(56) References Cited

U.S. PATENT DOCUMENTS

| | | | |
|---|---|---|---|
| 2,763,707 A * | 9/1956 | Soderberg | 174/50 |
| 3,068,316 A | 12/1962 | Witt | |
| 3,089,210 A * | 5/1963 | Ritter | 174/135 |
| 3,782,654 A | 1/1974 | Kasa | |
| 4,407,460 A | 10/1983 | Khudaverdian | |
| 4,475,649 A * | 10/1984 | Haarbosch | 174/135 |
| D278,095 S | 3/1985 | Werner | |
| 4,721,268 A | 1/1988 | Lerner et al. | |
| 4,858,846 A * | 8/1989 | McDonald | 242/405.1 |
| 4,944,694 A * | 7/1990 | Dorn | 439/501 |
| D374,174 S | 10/1996 | McClellan | |
| 5,613,648 A | 3/1997 | Paavila | |
| 5,684,274 A * | 11/1997 | McLeod | 174/92 |
| 5,834,694 A * | 11/1998 | Bakker et al. | 174/135 |
| 5,924,892 A * | 7/1999 | Ferracina | 439/501 |
| 6,273,354 B1 | 8/2001 | Kovacik et al. | |
| 7,399,201 B1 * | 7/2008 | Khorsand | 439/501 |

* cited by examiner

Primary Examiner — Angel R Estrada

(57) ABSTRACT

A cord management device is provided for storing excess length of electrical cord neatly in a compact space. The device provides a housing having a first open end and a second open end. The first open end and the second open end are each configured for passing a cord therethrough whereby a medial portion of the cord is positioned in the housing. The housing includes a medial portion and a medial opening positioned in the medial portion of the housing. A first access door is pivotally coupled to the housing for selectively closing over the medial opening in the medial portion of the housing.

12 Claims, 4 Drawing Sheets

CORD MANAGEMENT DEVICE

BACKGROUND OF THE DISCLOSURE

Field of the Disclosure

The disclosure relates to cord management devices and more particularly pertains to a new cord management device for storing excess length of electrical cord neatly in a compact space.

SUMMARY OF THE DISCLOSURE

An embodiment of the disclosure meets the needs presented above by generally comprising a housing having a first open end and a second open end. The first open end and the second open end are each configured for passing a cord therethrough whereby a medial portion of the cord is positioned in the housing. The housing includes a medial portion and a medial opening positioned in the medial portion of the housing. A first access door is pivotally coupled to the housing for selectively closing over the medial opening in the medial portion of the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
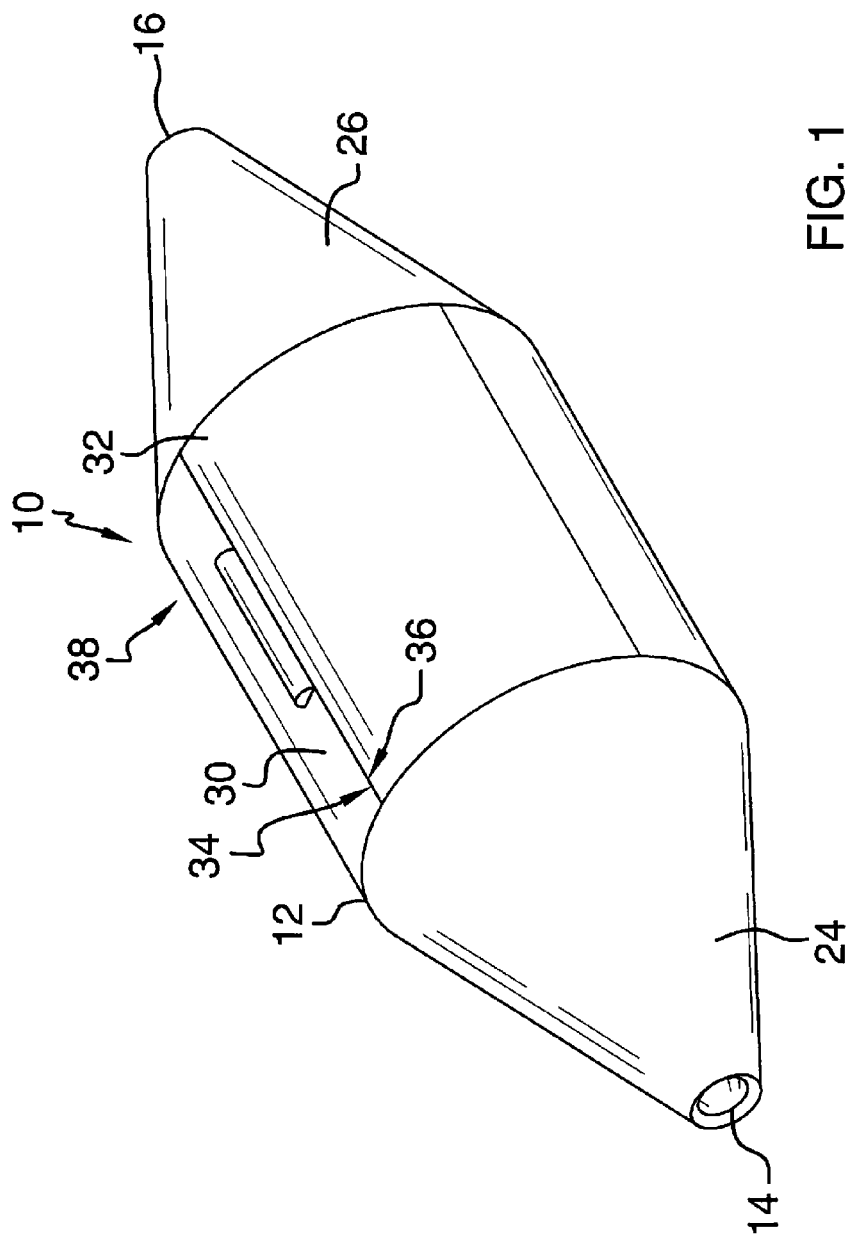
FIG. 1 is a top front side perspective view of a cord management device according to an embodiment of the disclosure.
Figure 2:
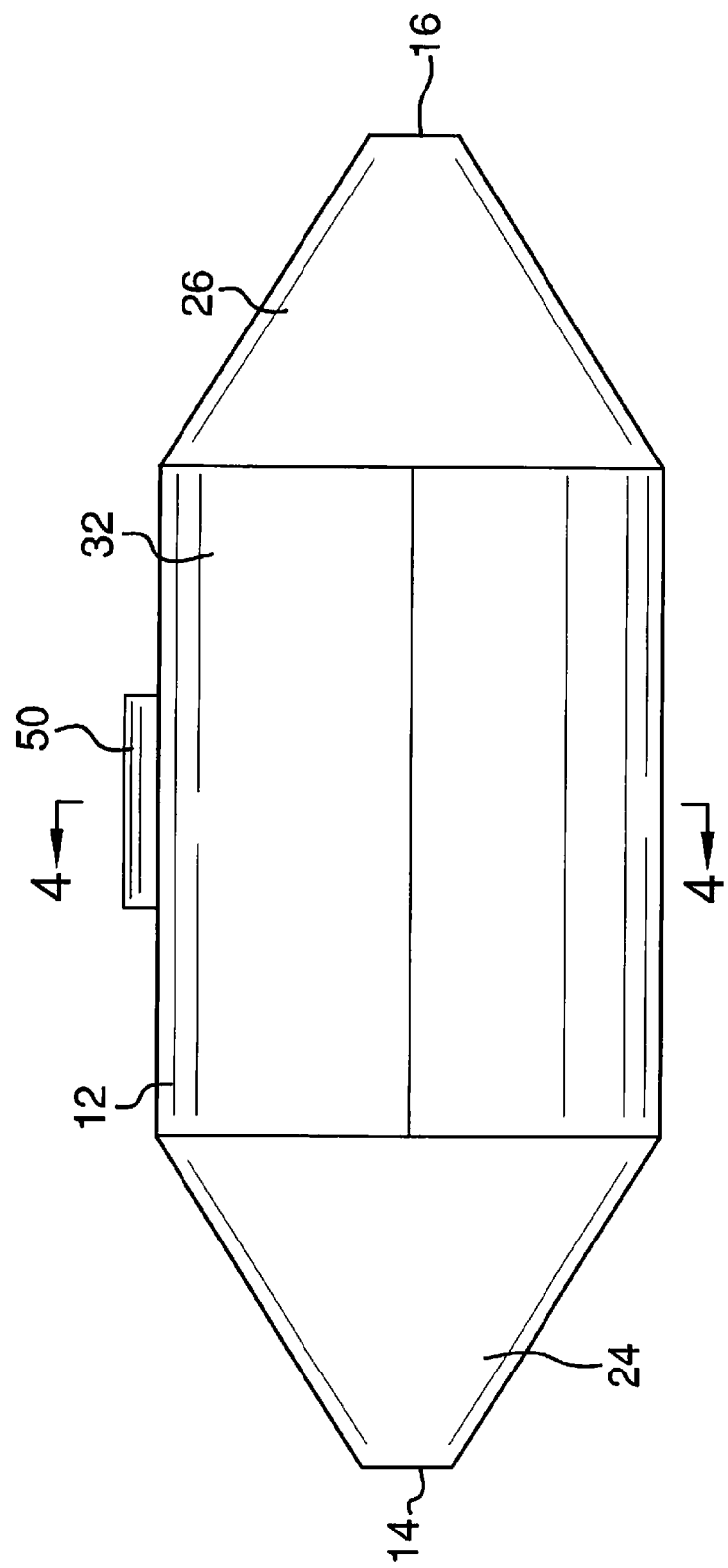
FIG. 2 is a side view of an embodiment of the disclosure.
Figure 3:
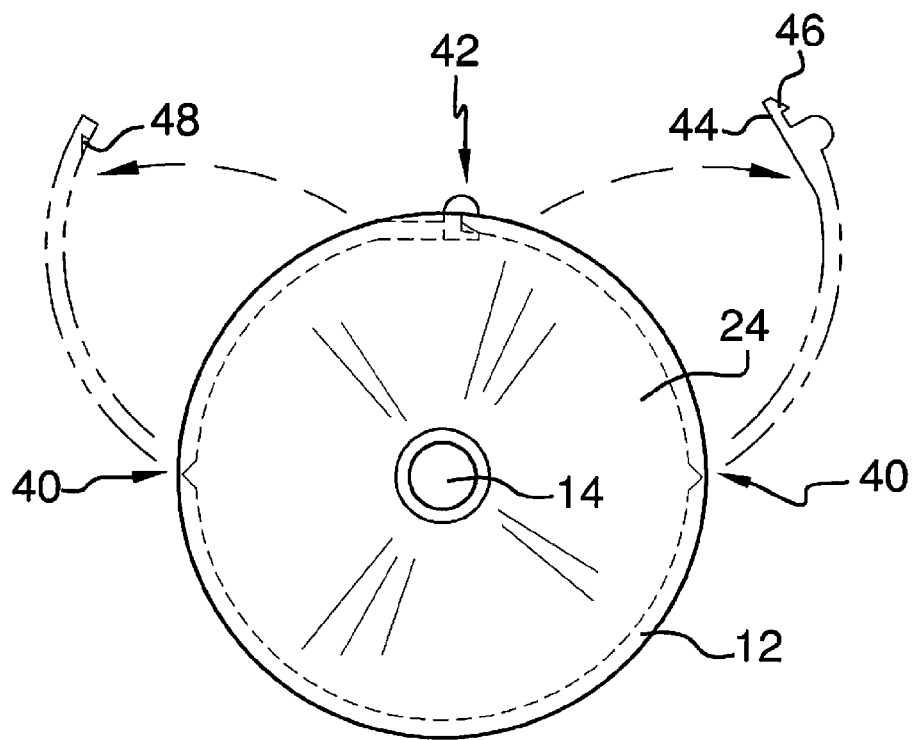
FIG. 3 is a front view of an embodiment of the disclosure.
Figure 4:
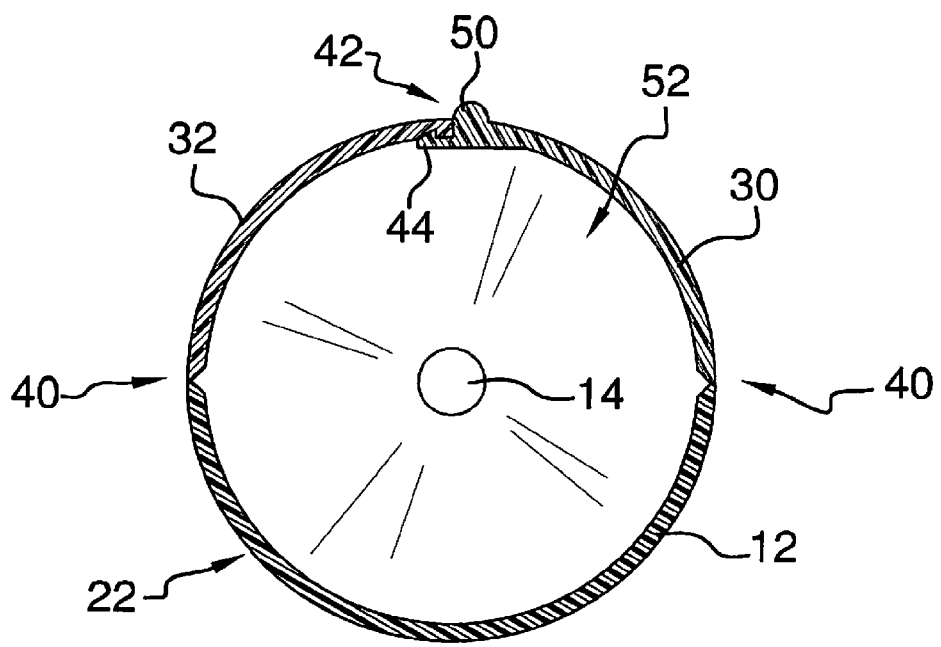
FIG. 4 is a cross-sectional view of an embodiment of the disclosure taken along line 4-4 of FIG. 2.
Figure 5:
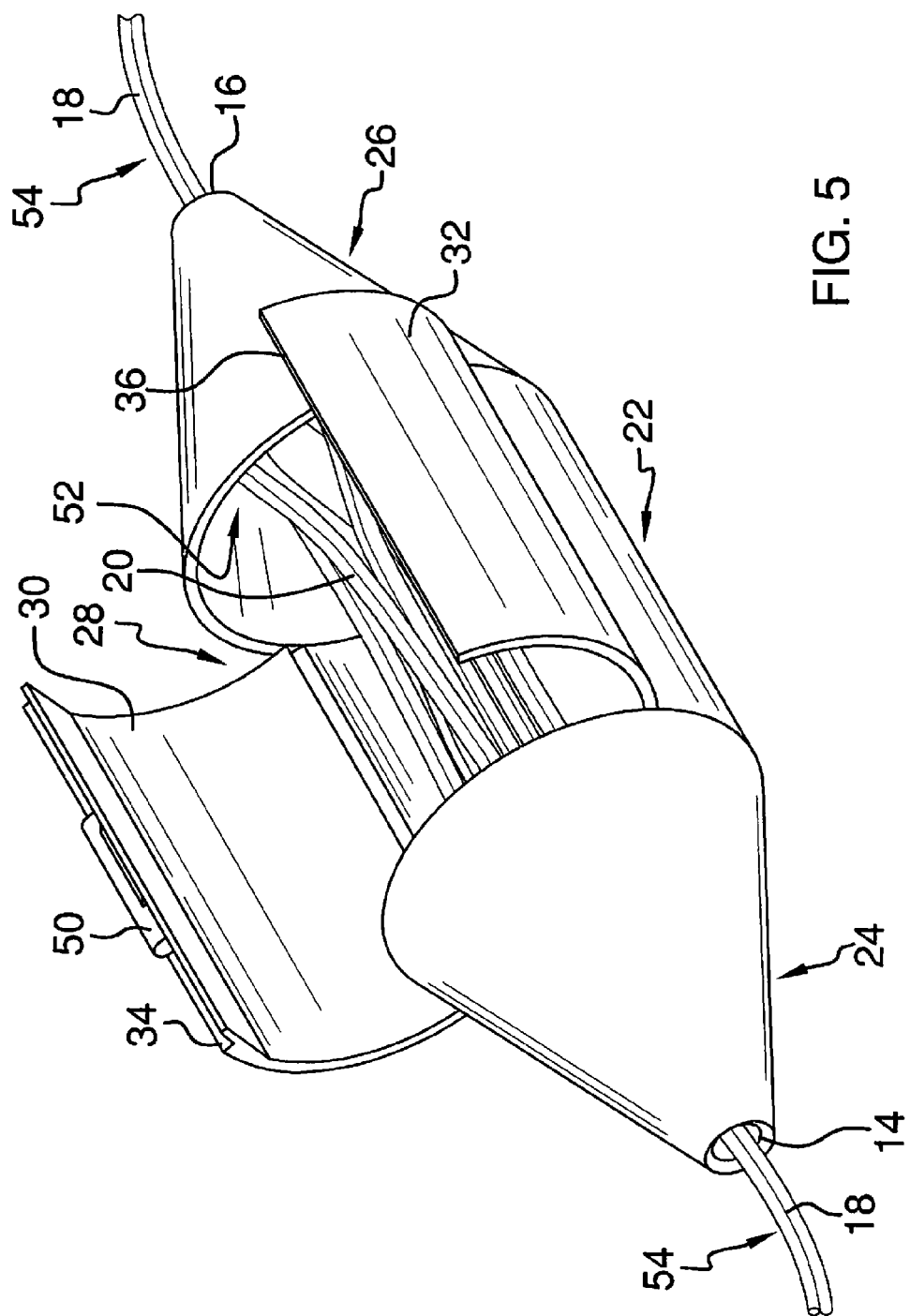
FIG. 5 is a top front side perspective view of an embodiment of the disclosure.

With reference now to the drawings, and in particular to FIGS. 1 through 5 thereof, a new cord management device embodying the principles and concepts of an embodiment of the disclosure and generally designated by the reference numeral 10 will be described.

As best illustrated in FIGS. 1 through 5, the cord management device 10 generally comprises a housing 12 having a first open end 14 and a second open end 16. The first open end 14 and second open end 16 are each configured for passing a cord 18 therethrough whereby a medial portion 20 of the cord 18 is positioned in the housing 12. The housing 12 may have a medial portion 22 and a first end section 24 extending between the first open end 14 and the medial portion 22 of the housing 12. The first end section 24 may be conical. The first end section 24 tapers extending from the medial portion 22 of the housing 12 towards the first open end 14. The housing 12 may also have a second end section 26 extending between the second open end 16 and the medial portion 22 of the housing 12. The second end section 26 may be conical. The second end section 26 tapers extending from the medial portion 22 of the housing 12 towards the second open end 16.

A medial opening 28 is positioned in the medial portion 22 of the housing 12. The medial opening 28 may extend over a 180 degree arc of the tubular medial portion 22 and extend a full length between the conical first end section 24 and the conical second end section 26. A first access door 30 is pivotally coupled to the housing 12. The first access door 30 is positioned for selectively closing over the medial opening 28 in the medial portion 22 of the housing 12. A second access door 32 may also be pivotally coupled to the housing 12 to selectively close over the medial opening 28 in the medial portion 22 of the housing 12. A distal edge 34 of the first access door 30 relative to the housing 12 abuts a distal edge 36 of the second access door 32 relative to the housing 12 when the first access door 30 and the second access door 32 are in a closed position 38. The first access door 30 and the second access door 32 may each be coupled to the housing 12 by a living hinge 40.

A clasp 42 may be coupled to the first access door 30. The clasp 42 may have a protrusion 44 extending from the distal edge 34 of the first access door 30. The protrusion 44 includes a barb 46 selectively engaging a notch 48 in the second access door 32 whereby the first access door 30 and the second access door 32 are secured in the closed position 38. A knob 50 may be positioned adjacent to the distal edge 34 of the first access door 30 to facilitate disengagement of the clasp 42 to permit access to an interior 52 of the housing 12.

In use, the cord 18 is put into the interior 52 of the housing through the medial opening 28. The cord 18 is positioned with opposite end portions 54 extending out of the first open end 14 and the second open end 16. The medial portion 20 of the cord 18 is folded make the cord 18 more compact as desired to keep an ambient space around the cord 18 neat and prevent tangling of the cord 18. The first access door 30 and second access door 32 are pivoted into the closed position 28 then held in the closed position 28 with the clasp 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A cord management device comprising:
    a housing having a first open end and a second open end, said first open end being configured for passing a cord therethrough, said second end being configured for passing the cord therethrough whereby a medial portion of the cord is positioned in said housing, said housing having a medial portion;

a medial opening positioned in said medial portion of said housing; and a first access door pivotally coupled to said housing, said first access door selectively closing over said medial opening in said medial portion of said housing; and a second access door pivotally coupled to said housing, said second access door selectively closing over said medial opening in said medial portion of said housing.

2. The device of claim 1, further including said medial portion of said housing being tubular.

3. The device of claim 1, further including said housing having a first end section extending between said first open end and said medial portion of said housing.

4. The device of claim 3, further including said first end section being conical.

5. The device of claim 4, further including said first end tapering extending from said medial portion of said housing towards said first open end.

6. The device of claim 1, further including said housing having a second end section extending between said second open end and said medial portion of said housing.

7. The device of claim 6, further including said second end section being conical.

8. The device of claim 7, further including said second end tapering extending from said medial portion of said housing towards said second open end.

9. The device of claim 1, further including a distal edge of said first access door relative to said housing abutting a distal edge of said second access door relative to said housing when said first access door and said second access door are in a closed position.

10. The device of claim 9, further including said first access door and said second access door each being coupled to said housing by a living hinge.

11. The device of claim 9, further including a clasp coupled to said first access door, said clasp selectively engaging said second access door whereby said first access door and said second access door are secured in said closed position.

12. A cord management device comprising:

a housing having a first open end and a second open end, said first open end being configured for passing a cord therethrough, said second end being configured for passing the cord therethrough whereby a medial portion of the cord is positioned in said housing, said housing having a medial portion, said housing having a first end section extending between said first open end and said medial portion of said housing, said first end section being conical, said first end tapering extending from said medial portion of said housing towards said first open end, said housing having a second end section extending between said second open end and said medial portion of said housing, said second end section being conical, said second end tapering extending from said medial portion of said housing towards said second open end;

a medial opening positioned in said medial portion of said housing;

a first access door pivotally coupled to said housing, said first access door selectively closing over said medial opening in said medial portion of said housing;

a second access door pivotally coupled to said housing, said second access door selectively closing over said medial opening in said medial portion of said housing;

a distal edge of said first access door relative to said housing abutting a distal edge of said second access door relative to said housing when said first access door and said second access door are in a closed position, said first access door and said second access door each being coupled to said housing by a living hinge; and a clasp coupled to said first access door, said clasp selectively engaging said second access door whereby said first access door and said second access door are secured in said closed position.

\* \* \* \* \*